April 26, 1932.     J. N. SMITH     1,855,732
ELECTROLYTIC CELL
Filed Aug. 21, 1928     2 Sheets-Sheet 2
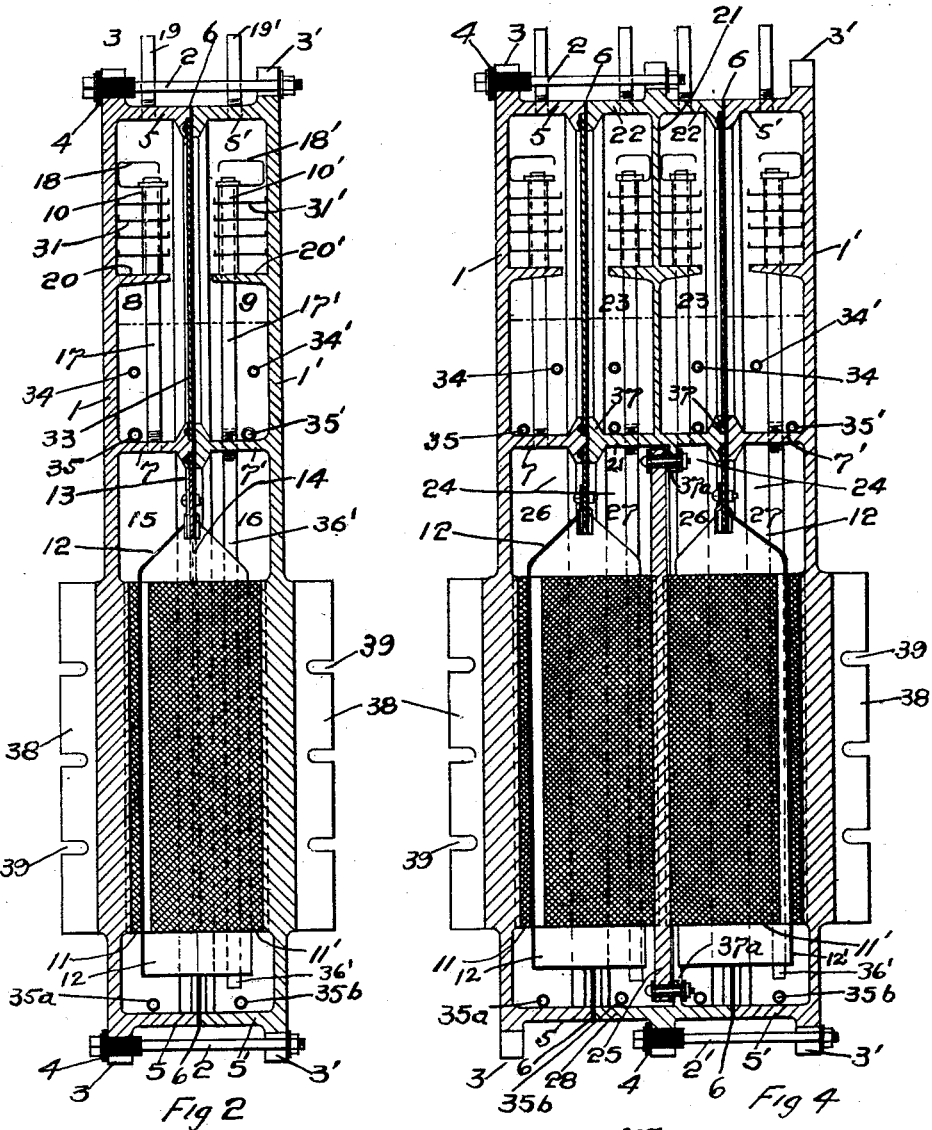
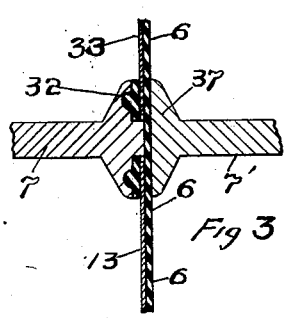
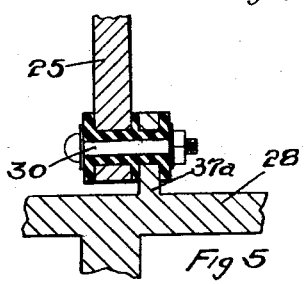

Patented Apr. 26, 1932                                                1,855,732

UNITED STATES PATENT OFFICE

JAMES NORMAN SMITH, OF TORONTO, ONTARIO, CANADA, ASSIGNOR, BY MESNE ASSIGNMENTS, TO WESTINGHOUSE ELECTRIC & MANUFACTURING COMPANY, A CORPORATION OF PENNSYLVANIA

ELECTROLYTIC CELL

Application filed August 21, 1928. Serial No. 301,144.

This invention relates to electrolytic cells, more particularly to cells for the electrolysis of water.

The object of this invention is to provide a simplified electrolytic cell which shall occupy a minimum amount of space, be efficient in operation and readily assembled.

To this end, I have invented an electrolytic cell or electrolyzer which has combined with it a gas-electrolyte separator to form a unitary enclosed structure.

The invention also embodies a novel and efficient means in each chamber for separating the gas from the gas-electrolyte mixture, the anolyte and catholyte being then returned to and mixed in the electrolyzer, as well as other constructional features to be described hereafter and which are illustrated in the accompanying drawings, wherein:

Fig. 2 is a cross-section on the line 2—2 of Fig. 1;

Fig. 3 is an enlarged detail view of a part of the cell as shown in Figs. 2 and 4;

Fig. 4 is a cross-sectional view, similar to Fig. 2, showing a multi-cell or bipolar cell unit; and Fig. 5 is an enlarged detail view of a part of the cell as shown in Fig. 4.

Figure 1:
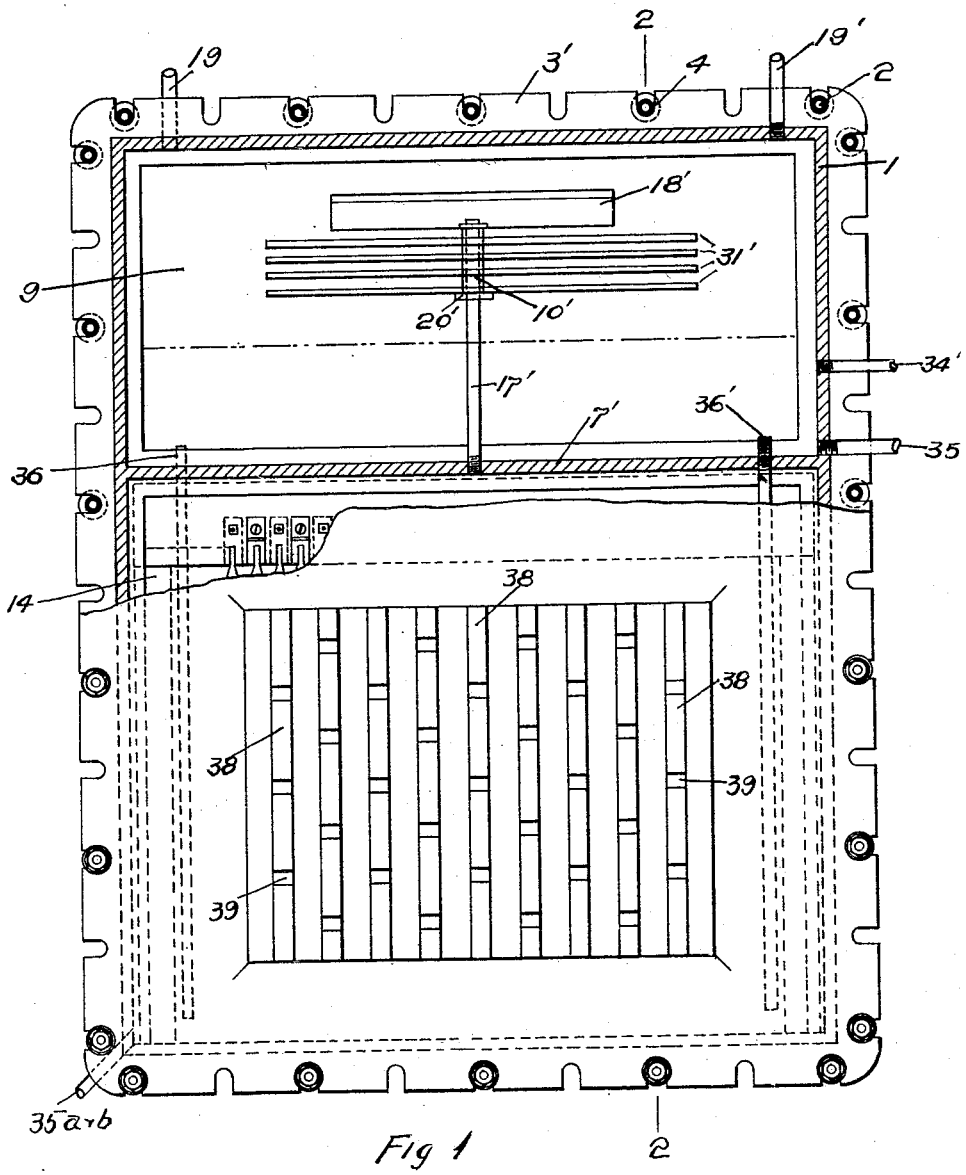
Fig. 1 is a view, partly in section, of a single unit of an electrolytic cell embodying my invention.

The single cell unit, shown in cross-section in Fig. 2, is composed of end plates, 1, 1', held together by bolts 2 at their flanged margins, 3, 3', to form a completely enclosed cell. One end of the bolts 2 is provided with an insulating bushing 4 so as to insulate said bolts from one of the end plates 1, and hence the end plates from each other.

The end plates at their meeting edges 5, 5' are further insulated from each other by an insulating gasket 6, which gasket is extended medially within and across the cell to form with transverse extensions 7, 7', from the end plates 1, 1', respectively, two chambers, anode 8 and cathode 9, in which are disposed the gas-electrolyte separators 10, 10'. The gasket 6 insulates the extensions 7, 7' from each other and also acts as a gas and liquid seal.

It will be observed that the transverse extensions 7, 7' (Fig. 2) also divide the cell into upper and lower chamber sections. In the lower section of the cell are disposed the electrodes 11, 11', which are mounted upon the end plates 1, 1', and extend transversely into the cell disposed between adjacent elements and separated by a pervious diaphragm 12, sinusoidal in form and free or unattached at the bottom but attached at the top to a supporting plate 13 (Fig. 3), and depending fins 14 of the plate 13 (Fig. 2), the diaphragm dividing the lower section of the cell into anode and cathode chambers 15 and 16, respectively.

The end plates 1, 1' are, of course, of opposite polarity and have cast-in or otherwise attached thereto, the electrodes 11, 11'. Adjacent electrodes of opposite polarity rest against opposite sides of the diaphragm 12 and form the active or electrolyzing zone.

In the electrolysis of water, oxygen will be evolved on one side of the diaphragm, and hydrogen on the other.

The gases rise in their respective chambers and are conducted, together with some of the electrolyte, through pipes 17, 17', upwardly, and the gas-electrolyte mixtures or emulsions are deflected downward, after being discharged through said pipes, by baffles 18, 18' upon a plurality of parallel screens 31, 31' through which the mixture or emulsion percolates by gravity and whereby the gas is partially separated from the electrolyte. The electrolyte, with some gas entrapped or otherwise mixed with it, falls to the bottom of the separator chambers 8—9 where the remainder of the gas separates therefrom. The free gas is then removed from the top of said separator chambers by pipes 19, 19'.

The screening elements are supported by extensions 20, 20' from the end plates 1, 1', and are mounted on the riser pipes 17, 17', as shown in Figs. 1 and 2.

The contruction of the multi- or bipolar cell (Fig. 4) is essentially the same as that for the single cell unit, except that the end plates 1, 1' have interposed between them intermediate cell members 21, 22 and 23.

The member 21 has upper flanges 22 and lower flanges 28 which abut against and are insulated from the upper and lower meeting edges of flanges 5, 5' of the end plates 1, 1' by the insulating gasket 6. The lower end of the member 21 is provided with similar transverse flanges 37 which abut against and are insulated from the transverse extensions 7, 7' of the end plates 1, 1'.

The intermediate cell is disposed between the insulating gaskets 6, 6 to form, together with it, an intermediate separator section having two separating chambers 23, 23, each having the separating means described above.

The electrolyzer is divided into two electrolyzing cells 24, 24 by an intermediate electrode support 25, and each of said cells is further divided into an anode chamber 26 and a cathode chamber 27 by the diaphragm 12.

The bipolar support 25 (Figs. 4–5) is insulatively attached at its upper and lower ends to transverse extensions 37a from the intermediate separator member 21 and flange 28, disposed between the lower meeting edges of the flanges 5 and 5' of the end plates 1, 1', respectively, as shown in Fig. 4, and at its sides to similar extensions of the intermediate separator section.

The intermediate separator flange 22 is bolted by the insulated bolt 2 to one of the end plates 1, as in the previous instance, and the flange 28 similarly bolted by the insulated bolt 2' to the other end plate 1'.

In Fig. 5 is shown in enlarged detail a method of insulatively attaching the bipolar electrode support 25 to 37a extending from flange 28. A bolt 30 is passed through both flange 28 and electrode support 25 and is insulated therefrom, the flange and support being insulated from each other. The upper and lower part and the sides of the support 25 are similarly attached to and insulated from the intermediate separator section 37a.

Fig. 3 shows in detail the manner in which the transverse extensions (7, 7' of Fig. 2 or 7, 7' and 37 of Fig. 4) of the separator sections may be insulated from each other and at the same time support the insulating gasket 6 and the diaphragm 12. The lower part of the extensions (7, 7' or 37) clamp the supporting plate 13 to which the diaphragm 12 is attached, and said plate is insulated from said extensions by the insulating gasket 6 and gasket 32 disposed within one of the extensions.

A similar plate 33, for protecting the gasket from the action of the oxygen, is similarly clamped and insulated between upper portions of said extensions.

Referring to the water supply and the circulating system of the cell, water is introduced into the separator chambers 8—9 through ducts 34—34', and solid matter or sludge may be removed through outlet ducts 35, 35' disposed near the bottom of the separator chambers. Similar outlets 35a and 35b are provided at the bottom of the anode and cathode chambers 15—16. The anolyte and catholyte, after being freed of gas, are returned from the separator chambers 8—9 to the anode and cathode chambers 15—16 of the electrolyzer by pipes 36—36', which extend below the diaphragm 12, and become mixed in the electrolyzer, which is one of the features of this invention. The level of the electrolyte is kept approximately at the point below the screens indicated by the "dot and dash" line in the separator chambers 8—9.

Projecting ribs 38 (Figs. 1, 2 and 4), cast integral or welded to end plates 1, 1', are provided for attaching intercell connections. 39 indicates slots for the intercell connection bolts.

Having described my invention, what I claim is:

1. An electrolytic cell having disposed within its cell chambers means for separating a gas-electrolyte mixture comprising a baffle for deflecting downwardly the said mixture, and means disposed beneath said baffle adapted to intercept and separate the components of said mixture.

2. An electrolytic cell having disposed within its cell chambers means for separating a gas-electrolyte mixture comprising a baffle for deflecting downwardly the said mixture, and screens disposed beneath said baffle adapted to intercept and separate the components of said mixture.

3. A separator for gas-liquid mixtures comprising means for downwardly deflecting an upwardly projected stream of the mixture, and means disposed beneath said deflecting means adapted to intercept said mixture and separate the components thereof.

4. A separator for gas-liquid mixtures comprising a vertical conduit ejecting said mixture, a baffle disposed above it and adapted to deflect downwardly the said mixture, and screens disposed beneath said baffle adapted to intercept said mixture and separate the components thereof.

5. An electrolytic cell comprising means for separating the components of a gas-liquid mixture or emulsion which comprises means for ejecting said mixture upwardly, thence deflecting it downwardly, and permitting it to flow by gravity through means for separating the components of said mixture.

6. An electrolytic cell comprising means for separating the components of a gas-liquid mixture or emulsion which comprises means for ejecting said mixture upwardly, thence deflecting it downwardly, and means interposed in the path of the downwardly deflected gas-liquid for screening said mixture to separate the components thereof.

7. An electrolytic cell and separator for the electrolysis of water comprising a unitary structure having an electrolyzer separated into anode and cathode chambers by a pervious diaphragm, a superimposed separator having gas-anolyte and gas-catholyte chambers in which the gases are separated from the anolyte and catholyte, means in each of said separator chambers for separating the gases from the anolyte and catholyte, respectively, communicating pipes leading upwardly from the upper portions of said anode and cathode chambers to the upper portion of said gas-anolyte and gas-catholyte chambers, discharging the gas-anolyte and the gas-catholyte to said separating means therein, respectively, and communicating pipes leading downwardly from the bottom of said gas-anolyte and gas-catholyte chambers to the lower portions of said electrolyzer below the diaphragm separating the anode and cathode chambers, respectively.

Signed at Toronto, Province of Ontario, in the county of York and Dominion of Canada, this 16th day of Aug., A. D. 1928.

JAMES NORMAN SMITH.